Aug. 5, 1952 G. CHAUSSON 2,606,058
VEHICLE BODY AND CHASSIS CONSTRUCTION
Filed July 17, 1946 4 Sheets-Sheet 2
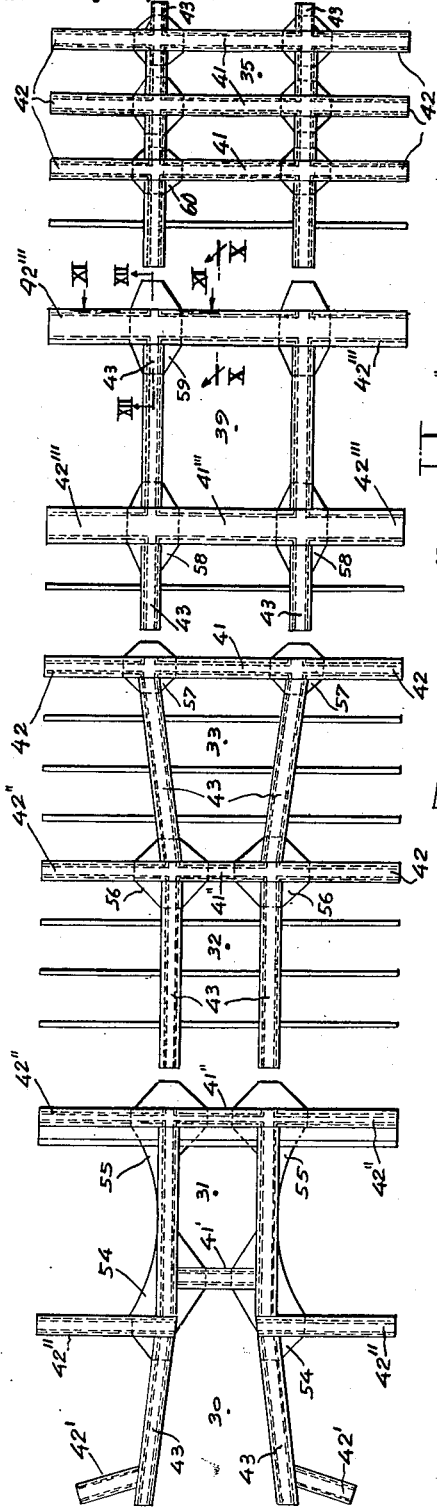
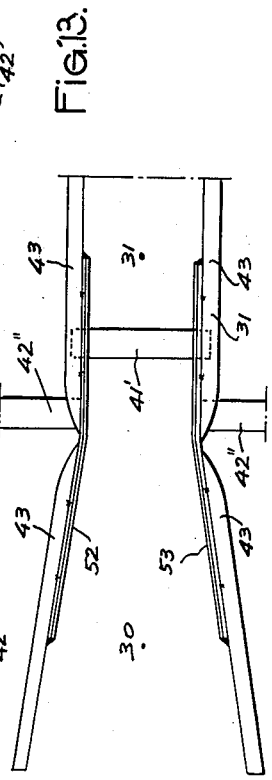
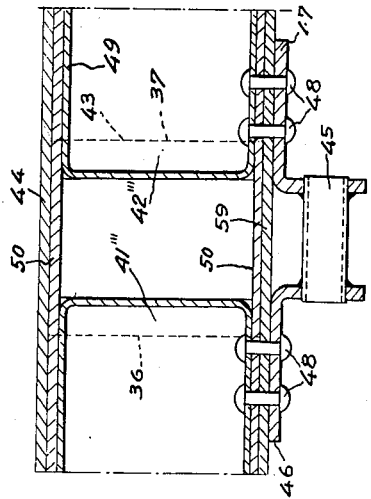
Inventor.
Gaston Chausson,
By
Attorney

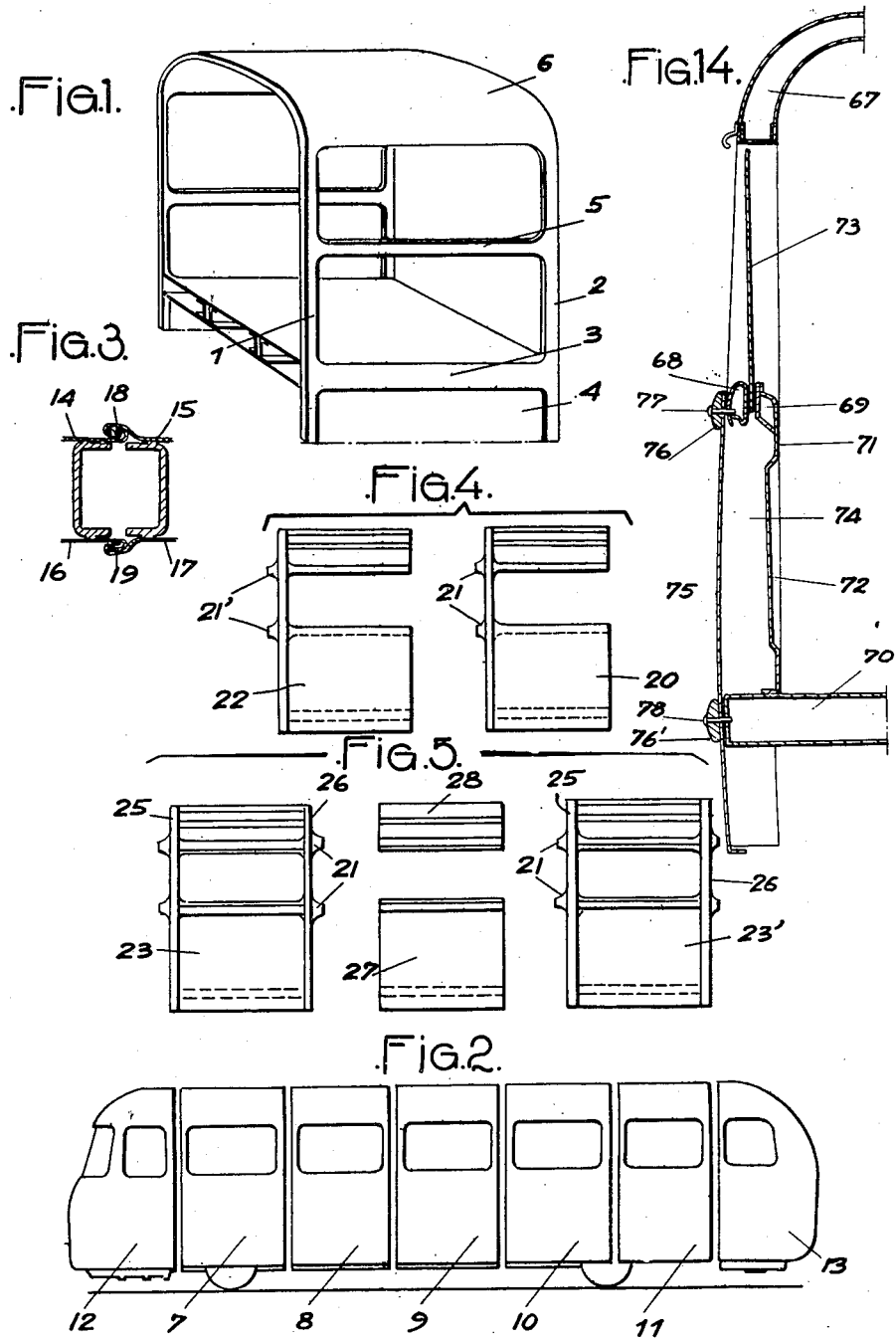

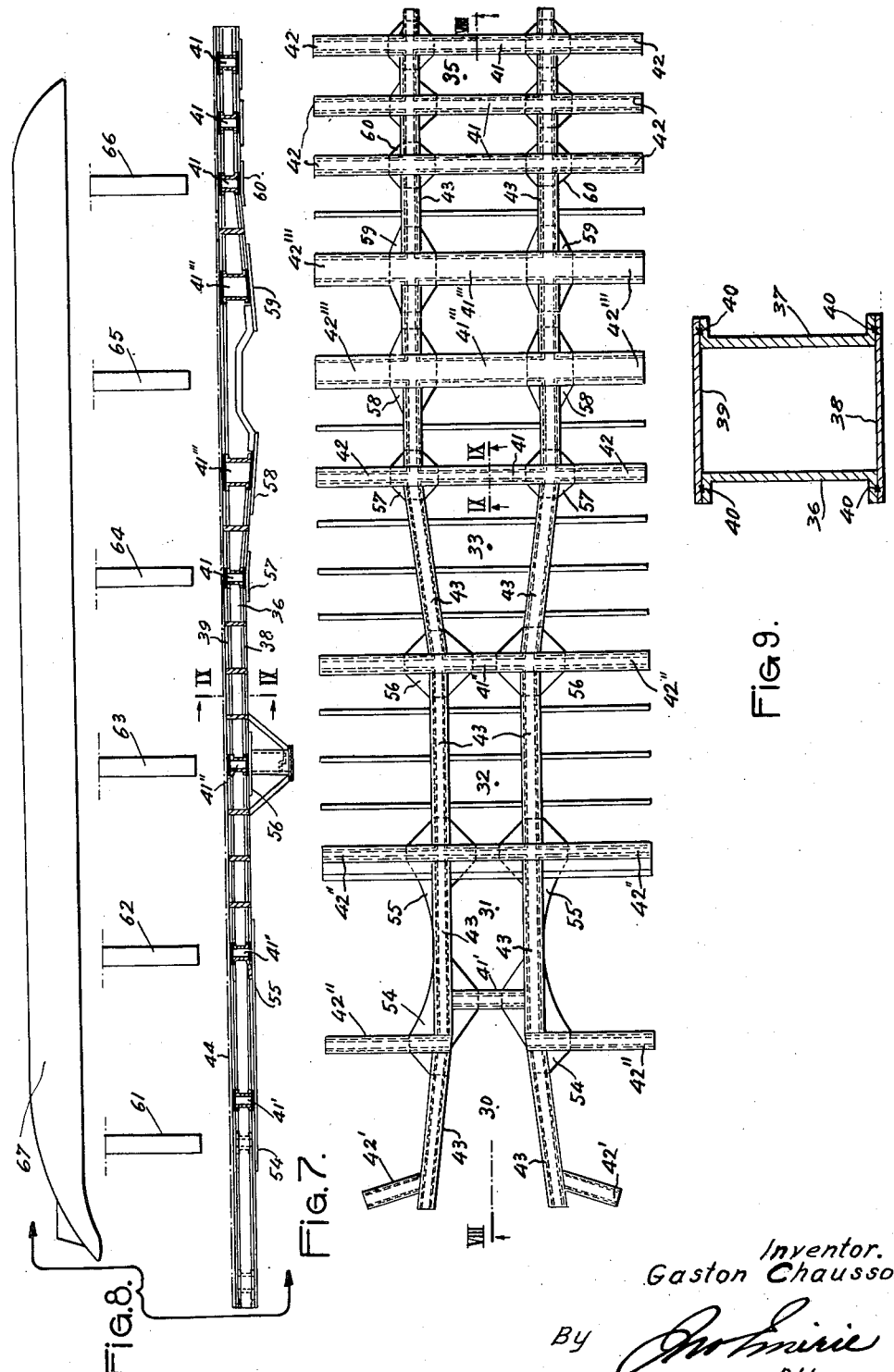

Aug. 5, 1952      G. CHAUSSON      2,606,058

VEHICLE BODY AND CHASSIS CONSTRUCTION

Filed July 17, 1946      4 Sheets-Sheet 4

Inventor.
Gaston Chausson,
By
Attorney

Patented Aug. 5, 1952

2,606,058

UNITED STATES PATENT OFFICE 2,606,058

VEHICLE BODY AND CHASSIS CONSTRUCTION

Gaston Chausson, Asnieres, France, assignor to Societe Anonyme des Usines Chausson, Asnieres, France, a company of France Application July 17, 1946, Serial No. 684,341
In France November 19, 1942

Section 1, Public Law 690, August 8, 1946
Patent expires November 19, 1962

2 Claims. (Cl. 296—28)

Hitherto, road motor vehicles have been assembled by mounting a body on a frame formed of heavy metal beams so that said vehicles are comparatively heavy.

It has been suggested to make so-called beam-body vehicles having no separate frame but comprising tubes or bars assembled to form a rigid unitary framework intended for withstanding the various stresses in use and for supporting the coverings of sheet-metal. Such vehicles having a unitary framework are also heavy owing to the larger number of metal pieces of which they are formed and which have an appreciable section.

My invention has for its object to provide a road vehicle of great length such as a motor coach or bus of a comparatively light weight while offering the rigidity and the strength which are necessary for use.

Another object of my invention is to provide a road motor vehicle of this kind formed of separately manufactured elements which are then assembled for forming the whole vehicle which makes it possible to manufacture the elements without cumbersome equipment.

Another object of my invention is to provide such a road vehicle in which each element is formed only of pressed sheet-metal pieces assembled by spot welding.

Another object of my invention is to provide a road motor vehicle formed of a base-structure comprising a certain number of separately manufactured elements each of which is formed of two lengths of tubular side-members constituted by sheet-metal pieces which are bent and assembled by welding, said lengths of side-pieces being connected together by cross-pieces and side-arms extending in the alignment of said cross-pieces on the outer sides of the side-members, assembling means such as gussets placed between the base-structure elements of the posts rising from said base-structure on each side of the vehicle, a hood also formed of unitarily assembled elements connecting said posts, working panels forming cross-pieces between said side-posts inside the vehicle, a non-working covering formed of removable sheet-metal pieces outside said posts, all the elements of the vehicle being constituted by sheet-metal pieces which are bent and assembled, the assembly between said pieces and between the elements being effected by spot welding.

Further objects and advantages of my invention will be apparent from the description and claims.

In the drawing, in which an embodiment of my invention is illustrated:

Figs. 1 to 5 show a form of execution of a road vehicle formed of complete frames mounted side by side and connected together for forming the tubular body or beam-body of the vehicle.

Fig. 1 is a perspective view of a frame.

Fig. 2 is a diagrammatical elevational view of the whole of the vehicle.

Fig. 3 is a detail view showing an assembly.

Fig. 4 is an elevational view showing another kind of assembly.

Fig. 5 is a diagrammatical elevational view showing another assembly.

Fig. 6 is a plan view showing separated elements of a base-structure for a vehicle.

Fig. 7 is a corresponding plan view showing the elements after assembly.

Fig. 8 is a side elevational view showing the base-structure in cross section corresponding to the line VIII—VIII of Fig. 7 and a partial view showing co-operating elements of the vehicle.

Fig. 9 is a sectional view through line IX—IX of Figs. 7 and 8.

Fig. 11 is a sectional view through line XI—XI of Figs. 6 and 10.

Fig. 13 is a plan view showing an assembly between both front elements of Fig. 7, and Fig. 14 is a vertical sectional view showing a side wall of the vehicle.

Figures 10, 12:
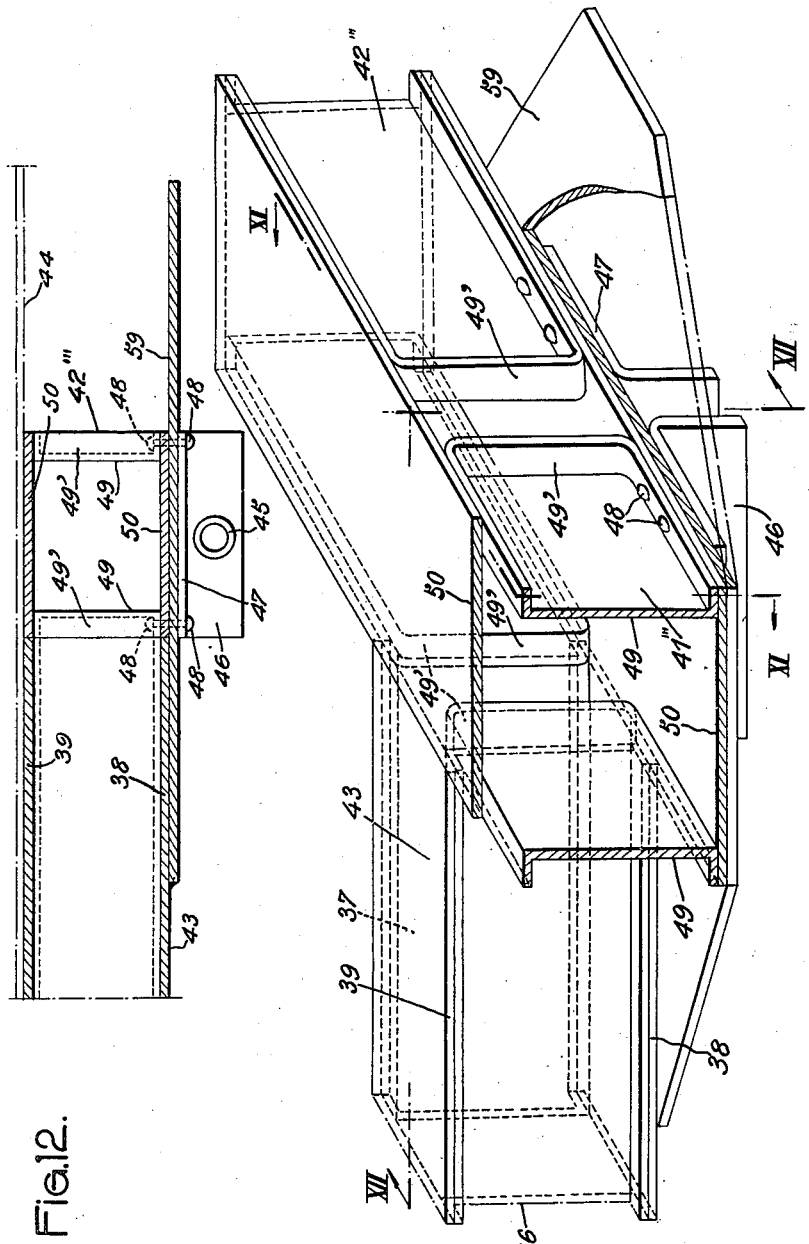
Fig. 10 is a sectional view in perspective through line X—X of Fig. 6.
Fig. 12 is a sectional view through line XII—XII of Figs. 6 and 10.

Fig. 1 shows one of said frames or annular elements comprising two half-frames 1 and 2 connected by the floor 3, a panel 4, not shown, cross-pieces 5 and the hood 6. As shown in Fig. 2 a vehicle such as a motor coach can be formed of five elements 7, 8, 9, 10, 11 similar to that of Fig. 1 and of two end elements 12, 13 made in a similar manner but with a suitable conformation.

The assembly of the annular elements can be made in any suitable manner. Fig. 3 shows, by way of example, a case in which the sheet-metal pieces 14, 15 and 16, 17 constituting each annular element are allowed to project beyond the ends of the latter whereafter said ends of the sheet-metal pieces are clamped as shown at 18, 19.

The elements can also be assembled by welding, riveting or by means of special profiles. Fig. 4 shows an annular element 20 comprising tenons 21 intended for entering corresponding recesses of the following frame 22 which also possesses corresponding tenons 21'.

Fig. 5 shows another modification in which annular elements 23, 23' are used having, on each side, annular armatures 25, 26, then intermediary pieces such as the panel 27 and the hood element 28, the assembly being effected by any suitable means such as, for example, tenons 21 and corresponding recesses.

Fig. 6 is a plan view showing, in a separated condition, elements of the base-structure of a vehicle which are shown assembled in Fig. 7.

Fig. 8 is in its lower part a longitudinal section along line VIII—VIII of Fig. 7 and in its upper part a sectional elevational view showing cooperating elements of the vehicle.

The base-structure is formed of a certain number of separately manufactured elements as, for example, the elements 30, 31, 32, 33, 34, 35. Each of said elements is constituted by two side-members made of sheet-metal pieces which are bent and welded in the form of a caisson as shown in Fig. 9 in which 36 and 37 are two U-shaped sidepieces assembled by means of two sheet-metal pieces 38, 39 for forming the caisson. Said pieces are assembled as by welding at 40. Connected with these side-member elements are cross-pieces 41, 41', 41'' or 41''' and supporting side-arms 42, 42', 42'', or 42'''.

As shown in Figs. 10, 11 and 12, a cross-piece 41 and an arm 42 are assembled with side members 43, the cross-pieces 41 extending between said side members and the arms 42 forming extensions of said cross-pieces, laterally beyond said side members 43. The cross-pieces 41 and arms 42 are box-shaped, like the side members 43, and are formed by side plates 49 and top and bottom plates 50. The side plates 49, however, have end flanges 49; as well as side flanges and the edges of these end and side flanges are secured to the end edges of the side plates 36 and 37 of the side members 43, as best shown in Fig. 10. The assembly of cross-pieces 41, side members 43 and arms 42 is re-inforced above by the sheet-metal piece 44 of the floor and below by a gusset on which angle-plates 46, 47 are laid. The whole is fastened by means of rivets 48 and the angle plates 46 and 47 are joined by a member 45 for supporting spring shackles or the like.

Lastly, Fig. 13 shows the assembly of two elements 30, 31 of the front part which are mounted side by side and connected by inner stiffeners 52, 53 spot welded on a substantial length on the side-member parts of the elements 30 and 31.

When each element 30 to 35 has been separately manufactured said elements are mounted side my side and connected together by means of gussets provided, for instance, at 54, 55, 56, 57, 58, 59, 60. Said gussets are welded on the various elements of the side-members, the cross-pieces and the side-arms lying at the intersections of assembly. The assembly of these various elements gives a perfectly coherent base-structure having a longitudinal strength insured by both side-members formed of lengths with a caissonshaped section. As shown in Fig. 8 the assembled sectional frames are formed from these elements by means of posts 61 to 66 rising from the intersections of the elements of the base-structure, then the tubular body or beam-body is completed by a hood 67 formed of separately manufactured elements mounted all in one block and the covering panels are interposed between the frames 61 to 66. Preferably the panels are double.

According to Fig. 14, 68 and 69 designate horizontal cross-pieces arranged between the frames. 70 designates the floor and 67 the hood. The inner panel 71 which preferably comprises ribs 72 contributes to the strength of the whole. A plateglass 73 can slide between both flanges 68 and 69 and the actuating device for said glass, the lock of a door or any other auxiliary elements can be lodged in the hollow space 74. Said space is closed by an outer covering panel 75 applied to the skeleton of the vehicle to which it can be secured by any means permitting of a ready disassembly. In the example shown the fastening of the panel 75 is effected by flat cover-plates 76, 76' secured both on the panel 75 and on the flange 68 and the floor 70 by means of screws 77, 78.

This feature of the invention is particularly important for the panels 71 which contribute to the strength of the whole of the body are put in place once for all during the construction of the vehicle. On the contrary, the outer covering panels 75 are readily removable and replaceable, which makes it possible to dismount them when damaged or for the inspection of mechanical devices in the hollow space 74.

Thus, the vehicle formed in this manner of base-structure elements entirely manufactured by means of sheet-metal pieces which are bent and assembled by welding, and then of frames mounted above said elements, and the hood which completes the whole, forms a very rigid and strong tubular unit or beam assembly.

This vehicle is particularly light, for each piece of an element or partial unit can be calculated so that it has only the thickness and the section which are strictly necessary at the particular place to be considered in the vehicle. The manufacture and the assembly which are effected only by pressing sheet-metal pieces and assembling them through electric spot welding while using gussets and stiffeners of a suitable form at the places where the assembly is effected, render possible a very ready manufacture and standardized production. Furthermore, the vehicle can be built so as to be longer or shorter according to the number of intermediary elements used for the construction of the base-structure and the hood.

Further modifications will be apparent to those skilled in the art and it is desired, therefore, that the invention be limited only by the prior art and the scope of the appended claims.

Having thus described my invention, what I claim and desire to secure by Letters Patent is:

1. A vehicle body of the type including a body portion supported by a chassis portion having frame members extending substantially the full length thereof, said body portion comprising a plurality of transverse sections including two end sections and a plurality of intermediate sections, each of said sections comprising a complete section of body construction mounted upon a complete section of chassis frame including sections of the longitudinal frame members, said transverse sections being assembled in alignment with the longitudinal frame sections aligned, the meeting edges of said body sections and of said chassis sections being rigidly and permanently joined together in alignment to form a complete body and chassis with rigid longitudinal frame members, said body sections having inner and outer side and top walls which are spaced by body frame sections that are supported by said chassis frame sections, said side and top walls being spaced by window openings, said inner side walls beneath said window openings and both said top walls above said window openings being rigidly and permanently fixed to said body frame sections to cooperatively strengthen said body section construction, and said outer side walls being removably mounted to permit access between said walls.

2. A combined vehicle body and chassis construction as defined in claim 1, wherein gussets are arranged on the under face of the meeting parts of said frame sections so as to strengthen the joints between the latter.

GASTON CHAUSSON.

REFERENCES CITED

The following references are of record in the file of this patent:

UNITED STATES PATENTS

| Number | Name | Date |
|---|---|---|
| 985,361 | McCauley | Feb. 28, 1911 |
| 1,872,506 | Sage | Aug. 16, 1932 |
| 1,880,842 | Curtiss | Oct. 4, 1932 |
| 2,037,765 | Dart | Apr. 21, 1936 |
| 2,039,318 | Kliesrath | May 5, 1936 |
| 2,055,594 | Steinecke | Sept. 29, 1936 |
| 2,059,866 | Hicks | Nov. 3, 1936 |
| 2,097,113 | Bradley | Oct. 26, 1937 |
| 2,128,930 | Fageol et al. | Sept. 6, 1938 |
| 2,389,907 | Helmuth | Nov. 27, 1945 |

FOREIGN PATENTS

| Number | Country | Date |
|---|---|---|
| 405,430 | Great Britain | Feb. 8, 1934 |
| 469,417 | Germany | Dec. 11, 1928 |
| 486,968 | Great Britain | June 14, 1938 |
| 491,383 | Great Britain | Sept. 1, 1938 |
| 519,886 | Great Britain | Apr. 9, 1940 |